(12) United States Patent
Enyedy

(10) Patent No.: US 6,759,623 B2
(45) Date of Patent: Jul. 6, 2004

(54) RADIAL TUBE TORCH HEAD

(75) Inventor: Edward A. Enyedy, Eastlake, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 10/238,223

(22) Filed: Sep. 10, 2002

(65) Prior Publication Data

US 2003/0010756 A1 Jan. 16, 2003

Related U.S. Application Data

(63) Continuation of application No. 09/666,753, filed on Sep. 21, 2000, now Pat. No. 6,495,798.

(51) Int. Cl.$^7$ .............................................. B23K 9/16
(52) U.S. Cl. ................ 219/75; 219/137.61; 219/137.62
(58) Field of Search ....................... 219/74, 75, 137.61, 219/137.62

(56) References Cited

U.S. PATENT DOCUMENTS

| | | | | |
|---|---|---|---|---|
| 3,083,289 A | * | 3/1963 | Munro et al. ................. | 219/75 |
| 3,389,844 A | * | 6/1968 | Rossner .................... | 242/615.3 |
| 3,433,418 A | | 3/1969 | Hach, Jr. | |
| 3,992,603 A | | 11/1976 | Reynolds | |
| 4,254,322 A | | 3/1981 | Asano | |
| 4,560,858 A | * | 12/1985 | Manning ............... | 219/137.52 |
| 4,647,754 A | | 3/1987 | Hirasawa | |
| 4,947,024 A | * | 8/1990 | Anderson .............. | 219/137.61 |
| 5,140,001 A | | 8/1992 | Allen et al. | |
| 5,148,001 A | | 9/1992 | Stava | |
| 5,892,199 A | * | 4/1999 | Ahmed et al. .......... | 219/137 R |
| 5,900,167 A | | 5/1999 | Rudnicki et al. | |
| 5,981,897 A | | 11/1999 | Offer et al. | |

FOREIGN PATENT DOCUMENTS

| | | | |
|---|---|---|---|
| EP | 0 324 088 A1 | * | 7/1989 |
| FR | 2565141 A | * | 5/1984 |
| GB | 2059846 | | 4/1981 |

OTHER PUBLICATIONS

MAGCI "A novel shielded arc welding process" *Metal Contruction*, Oct. 1982.

* cited by examiner

Primary Examiner—Kiley Stoner
Assistant Examiner—Kevin L McHenry
(74) Attorney, Agent, or Firm—Fay, Sharpe, Fagan, Minnich & McKee (57) ABSTRACT

A torch head having a base section, a tip section and three or more radial rods connected between the base section and the tip section. The radial rods form a generally circular inner chamber which inner chamber includes an electrode. One or more of the radial rods has an inner passageway to convey one or more shielding gasses and/or one or more cooling fluids from the base section to the tip section of the torch head. The cooling fluid cools at least a portion of the torch head. The shielding gas is directed about the electrode and onto the weld metal to improve the quality of the weld bead. One or more of the radial rods function as support structures to enhance the strength and the rigidity of the torch head. The tip section of the torch head is designed to direct the one or more shielding gas in a desired profile about the electrode and onto the weld metal. The tip section includes an electrical contact that form an electrical connection with the electrode as the electrode passes through the tip section. The electrical contact is made of a wear resistant material.

52 Claims, 7 Drawing Sheets

RADIAL TUBE TORCH HEAD

This application is a continuation of U. S. application Ser. No. 09/666,753, filed Sep. 21, 2000 now U.S. Pat. No. 6,495,798, entitled "RADIAL TUBE TORCH HEAD".

BACKGROUND OF THE INVENTION

The present invention relates to a welding machine for performing welding by shielding a weld part with a gas, and more particularly to a welding process which uses a consumable or non-consumable electrode in a specially designed torch head having a diameter smaller than conventional torch heads.

The welding torch can be used in a wide variety of welding processes, such as, but not limited to MIG, MAG, STT, and TIG welding. In a MIG, MAG or STT welding process, a consumable electrode wire is fed to a workpiece in which current is applied to the electrode to melt a consumable electrode and transfer the melted portion of the electrode to a workpiece. MIG, MAG and STT welding employs a continuously fed consumable electrode which is shielded by a shielding gas. An arc is formed between the workpiece and the consumable electrode which causes the electrode to melt and transfer to the workpiece in the form of a welding pool. The shielding gas typically employed is an inert gas which is supplied through the torch to protect the weld from oxidation and provide the desired arc characteristics during welding.

Several drawbacks exist with using existing welding apparatus for MIG, MAG and STT welding. During MIG, MAG and STT welding, a short circuit develops between the electrode and the workpiece during transfer of the molten metal to the workpiece. This short circuit occurrence typically results in spattering of the weld metal about the workpiece. This spatter can result in reduced quality weld beads and damage to the torch head or clogging of the torch head. In order to reduce the amount of spatter produced during the welding process, various control techniques have been devised. One such control technique for MIG welding to reduce spattering is the use of a pulse MIG process which is disclosed in U.S. Pat. No. 4,647,754, entitled "Consumable Electrode-type Pulse Arc Welding Machine." A control technique to reduce spatter for STT welding is disclosed in U.S. Pat. No. 5,148,001, entitled "System and Method of Short Circuit Arc Welding." U.S. Pat. Nos. 4,647,754 and 5,140,001 are incorporated herein by reference.

Another problem associated with MIG, MAG, STT, and TIG welding is that the torch head is too large for use in the welding of narrowly spaced areas. The torch head is generally a cylindrical design with a fresco-conical tip which has a cylindrical central passageway for the electrode, and one or more passageways formed about the electrode to accommodate shielding gases and/or cooling liquids. The incorporation of the passageways for the shielding gas and/or the cooling liquid results in a significantly increased diameter of the torch head.

Various torch head designs have been developed for use in narrower regions. Several of these torch head designs are shown in U.S. Pat. Nos. 3,992,603; 4,254,322; 5,900,167; and 5,981,897. In U.S. Pat. Nos. 3,992,603; 4,253,322 and 5,900,167, the torch head is formed as a linear torch head. In the '603 patent, the torch head only includes an electrode opening and a cooling passageway positioned at one side of the electrode opening. The cooling passageway is linearly spaced from the electrode opening. The '322 patent discloses a torch head design that includes an electrode opening, shielding gas passageways positioned on both sides of the electrode opening, and two cooling liquid passageways positioned on one side of the electrode opening. The shielding gas, cooling passageways and electrode opening are all linearly aligned with one another. The '167 patent discloses a torch head that includes an electrode opening and two shielding gas tubes spaced from and positioned on both sides of the electrode opening.

Although these welding torch designs reduce one dimension of the torch head, i.e., the width, the length of the torch head is significantly increased. As a result, these torch heads can only be used in limited applications. Furthermore, due to the linear torch head design, the torch head is susceptible to bending when the torch head contacts the workpiece or other objects, thus resulting in improper welding and/or low quality weld bead formation. Furthermore, these torch head designs are highly susceptible to clogging due to spattering of the weld metal. Due to the narrow passageways of the tubes of these torch heads, spattering during the welding process can easily clog one or more of the tubes during the welding process. Furthermore, due to the design of the weld head, cleaning of the components of the weld head are very difficult, thus resulting in frequently replacing the components of the weld head. The linear design of these torch heads also does not provide uniform cooling of the torch head or uniform distribution of shielding gas about the electrode and weld metal. The proper cooling of the torch head facilitates in preventing damage to the components of the weld of the torch head. The proper distribution of shielding gas about the electrode and weld metal ensure proper arc characteristics during the welding process and facilitates in ensuring that a high quality weld bead is formed.

In view of the existing torch head designs, there is a need for a torch head design that has a smaller diameter than the present torch head designs and a torch head that provides adequate cooling to the torch head during welding and provides a uniformed and controlled distribution of shielding gas about the electrode and weld metal.

SUMMARY OF THE INVENTION

The present invention pertains to an improved welding torch head and more particularly to a welding torch head used in MIG, MAG or STT welding in which such welding torch head has a smaller torch head diameter than past torch heads to allow for welding in narrow workpiece regions. As can be appreciated, the invention has broader applications that can be used in other types of short circuit welding such as plasma arc welding, or TIG welding. However, the invention is particularly applicable to MIG, MAG and STT welding and will be described with particular relationship thereto.

In accordance with the principal aspect of the present invention, there is provided a welder that includes a torch head. In one embodiment, the welder includes a power supply to supply current to the electrode in the torch head. In another embodiment, the welder includes a welding circuit which controls one or more electrical or power parameters of the electrode during the welding process. In still another embodiment, one or more shielding gas sources are used with the welder to provide shielding gas about the electrode and/or to protect the weld metal during the welding process. Shielding gases also can be used to obtain the desired electric arc characteristics during a welding process. In still yet another embodiment, the welder includes a wire feeder to feed a consumable electrode through the torch head. In one specific aspect of this embodiment, the wire feeder includes a controller to feed the desired amount of electrode through the torch head during the welding process. The specially designed torch head of the present invention includes a base section and a body section connected to the base section. In a further embodiment, the base section includes one or more openings or connectors to enable one or more shielding gases and/or cooling fluids to be connected to the base section. When a consumable electrode is used, the base section also includes an opening to enable the consumable electrode to pass through the base section and into the body section of the torch head. In yet a further embodiment, the base section includes one or more electrical connectors to provide voltage and current to the electrode in the torch head. The body section of the torch head includes a uniquely designed arrangement of rods or tubes. These rods or tubes are arranged with respect to one another to form an inner chamber between the rods. In yet still a further embodiment, at least one of the rods includes an inner passageway to allow one or more shielding gases to pass there through. The passageway in the shielding gas rod allows shielding gas, which is directed into the base section of the torch head, to be conveyed through the base section and through the shielding gas rod. In still yet a further embodiment, the torch head includes at least two rods having inner passageways for the conveyance of cooling fluid within the inner passageways. These two cooling fluid rods enable cooling fluids, which is conveyed into the base section, to pass through the cooling fluid rods. The cooling fluid that passes through the rods cools the torch head components during welding. The rod design of the torch head provides an improved packaging arrangement for the torch head. Torch heads which are moderate to high powered require water cooling and it becomes difficult to design traditional concentric tube designed torch heads into a small package. Typically, the inner diameter of a torch head is about 0.25 in. This is a typical size for a spring wire liner which receives an electrode. When water passages are concentrically arranged about the inner diameter passageway, these passageways have a wall thickness of about 0.02 in. and a 0.05 in. gap to allow water to pass there through. Two water passageways are required to be used since one passageway allows the water to flow into the torch head while the other water passageway allows the water to return. When the size of these diameters are summed up, a concentrically designed welding torch head which only includes a passageway for the electrode and two water cooling passageways has a diameter of about 0.57 in. This diameter is based upon the ideal situation that desired size tubes are readily available and that thinly designed tubes have a large diameter but thin wall thicknesses are available. If these two ideal situations do not exist, the diameter of the welding torch body further increases. When one or more shielding gases are to be used, additional concentric passageways are required which results in an increased torch head diameter to accommodate these concentrically designed passageways for the shielding gas. The radial tube design of the torch head overcomes this problem by eliminating the required concentric passageways in typical torch heads and by providing the passageways for the one or more shielding gases and/or cooling fluids in the tubes themselves. Three or more small tubes are arranged in a generally circular pattern which diameter of the generally circular pattern is significantly less than the diameter of a concentrically designed welding torch head. By using the small tubes, it is possible to have thinner wall thicknesses and still maintain the structural rigidity of the welding torch head. In one specific aspect of this embodiment, radial tubes have an outer diameter of about 0.05–0.12 inch and a wall thickness of about 0.01–0.05 inch. The radial tube arrangement having ten tubes with a wall thickness of 0.02 inch and an inner passageway diameter of 0.05 inch that encircles a typical 0.25 inch spring wire liner forms a torch head diameter of about 0.43 inch. The diameter is significantly less than traditional torch head diameters. In still another embodiment, two or more of the radial rods have the same outer diameter. In one specific aspect of this embodiment, all the radial rods have the same outer dimension.

In accordance with another aspect of the present invention, at least three radial rods form the body of the torch head. At least one of the radial rods includes an inner passageway to convey a shielding gas and/or cooling fluid. In one embodiment, the torch head body includes 3–20 rods, preferably 3–12 rods, and more preferably, 6–12 rods. In another embodiment, the torch head body includes at least one radial rod to convey a shielding gas and at least two radial rods to convey a shielding gas and at least two radial rods to convey a cooling fluid. In one specific aspect of this embodiment, the torch head body includes 1–10 radial rods for conveying one or more shielding gasses and 2–16 rods for conveying one or more cooling fluids. In yet another embodiment, the torch head body includes one or more structural rods. The structural rods provide structural rigidity and strength to the body of the torch head. The structural rods can be solid or include one or more non-solid sections. In one specific aspect of this embodiment, the torch head body includes 1–15 structural rods. In still another embodiment, one or more of the radial rods are made of metal. In one specific aspect of this embodiment, the radial rods include copper, copper alloy, stainless steel and/or titanium. In another specific aspect of this embodiment, two or more of the radial rods are made of the same material. In still another specific aspect of this embodiment, the shielding gas rods are made of the same material, the cooling fluid rods are made of the same material, the cooling fluid rods are made of the same material, and the structural rods are made of the same material.

In accordance with still another aspect of the present invention, a tip section is connected to the radial tubes at the tube end opposite of the tube end connected to the base section. In one embodiment, the upper portion of the tip section includes one or more passageways that are designed to receive shielding gas and to convey the shielding gas to the lower portion of the tip section. In another specific aspect of this embodiment, the upper portion of the tip section includes at least one passageway to fluidly connect two or more cooling tubes together. In another embodiment, the tip section includes a lower portion that has one or more passageways to convey a shielding gas about an electrode and/or weld pool during the welding process. In yet another embodiment, the tip section includes at least one electrode contact to form an electrical connection with an electrode. In one aspect of this embodiment, the tip section includes an electrical contact which is designed to engage a portion of the electrode in the tip section to form an arc between the electrode and the workpiece and/or to melt a portion of a consumable electrode to form the weld bead in the workpiece. In still another embodiment, the tip section includes at least one sleeve to direct a shielding gas about the electrode and on to the weld metal in the workpiece. In one aspect of this embodiment, two shielding gases are supplied to the torch bead and the tip section includes two sleeves which are positioned adjacent one another such that the inner sleeve directs shielding gas around the electrode and weld metal and the outer sleeve directs a shielding gas about the shielding gas to form a stratified shielding gas about the electrode and weld bead. In accordance with yet another embodiment, the tip section includes an upper portion and a lower portion wherein the lower portion is releasably secured to the upper portion. The two-section design of the tip section enables an operator to remove the lower portion of the tip section for purposes of cleaning and inspection of the various components of the tip section without having to completely disengage the tip section from the radial rods. This design facilitates in easier cleaning and maintenance of the tip section.

In accordance with yet another aspect of the present invention, one or more of the radial tubes are coupled together between the ends of the radial tubes. In one embodiment, the coupler is in the form of solder wherein the solder connects together one or more of the radial rods. In another embodiment, the coupler is a coupling sleeve wherein two or more rods pass through the coupling sleeve and are rigidly held in position relative to one another by the coupling sleeve. In still another embodiment, the coupler engages all the radial rods to maintain them in position with respect to one another. In still another embodiment, two or more couplers can be used. In one specific aspect of this embodiment, a coupling sleeve in combination with solder is used to secure together the radial rods. As can be appreciated, other coupler arrangements can also be used individually or in combination to rigidly maintain two or more rods in location with respect to one another and/or to provide structural rigidity to the torch head.

In accordance with still yet another aspect of the present invention, two or more shielding gases are directed to the base section of the torch head and through a plurality of radial rods or tubes to provide a plurality of shielding gases about the electrode and/or weld bead. In one embodiment, an inert gas and carbon dioxide are directed to the weld pool region. The inert gas may be any number of gases such as argon, helium or the like. In another embodiment, the shielding gases are directed to the weld bead in a certain arrangement to create a stratified shielding gas about the electrode and/or weld rods. In one specific aspect of this embodiment, the inert gas is directed close to the electrode and the carbon dioxide is directed about the inert shielding gas. This stratified shielding gas arrangement has been found to make the bead hotter during welding and also to form a flatter weld bead which is highly desirable in various welding applications. The inert gas is used to prevent contamination of the weld metal during welding. The carbon dioxide, which surrounds the inert gas, increases plate heating and increases the effective heat about the electrode. Inert gas, such as argon and/or helium, by itself forms a cold weld which results in poor weld beads. Carbon dioxide by itself forms a hot weld which results in high spattering. The combination of these two gas during welding compliment one another to create a desirable welding environment. The increase in the effective heat enhances both the MIG welding process and the TIG welding process. The stratified gas welding increases the effective heat about the electrode, thus reducing spattering during welding. Another advantage of stratified gas welding is that reduced gas flows are required during welding thereby resulting in reduced costs. In still another embodiment, the ratio of the inert gas to the carbon dioxide is from about 1:1 to 1:10. In still yet another embodiment, the carbon dioxide volume through the torch head is greater than the inert gas volume. In a further embodiment, the shielding gases are directed in a laminar flow about the electrode and/or about the weld bead region during welding.

In still yet another aspect of the present invention, the welder includes a shielding gas controller to regulate the flow rate of shielding gas through the torch head so as to ensure the desired amount of shielding gas around the electrode and weld metal. When two or more shielding gases are used, the gas controller controls the flow rates and ratios of the shielding gases to the work place region. In one embodiment, the gas controller ensures that a substantially laminar flow of the one or more shielding gas is obtained through the tip section thereby providing controlled shielding about the electrode and/or in the weld area.

In still a further aspect of the present invention, the tip section of the torch head includes a wear resistance electrical contact. Many welding processes, which include the use of a consumable electrode, direct the consumable electrode through the tip section of the torch head. An electrical contact is positioned in the tip section to form an electrical connection with the moving consumable electrode. Generally, the electrical contact is copper. As the electrode passes through the tip section, the electrode wears down the electrical contact. As a result, faulty electrical connections between the consumable electrode and the tip section periodically occur, thus requiring a new electrical contact to be inserted into the tip section. In order the reduce or effectively eliminate the need to replace the electric contract over the life of the tip section, an improved electrical contact is provided in the interior of the tip section which electrical contact is wear resistance and provides satisfactory electrical conduction to the consumable electrode. In one embodiment, the electrical contact includes tungsten, a copper-tungsten alloy and/or a copper-ceramic matrix. Electrical contracts that include or are completely made of tungsten, a copper-tungsten alloy and/or a copper-ceramic matrix have excellent wear resistance. In one specific aspect of this embodiment, the electrical contract is made of tungsten. In another embodiment, the electrical contact is made of two of more components. In one specific aspect of this embodiment, the electrical contact includes an outer sleeve material that includes a material having a high thermal conductivity to increase the heat transfer from the outer sleeve to an interior sleeve. High thermal conductive materials include copper, copper alloys, aluminum and aluminum alloys. In another specific aspect of this embodiment, the electrical contact includes an inner sleeve having excellent wear resistant characteristics. Wear resistant materials include tungsten, a copper-tungsten alloy and/or a copper-ceramic matrix materials. In still another specific aspect of this embodiment, the outer sleeve is made of a different material from the inner sleeve. In still yet another specific aspect of this embodiment, the inner sleeve is removable from the outer sleeve. The ability to remove the inner sleeve enable the inner sleeve to be replaced when required without having to completely remove the electrical contact from the tip section of the torch.

In still yet a further aspect of the present invention, the tip section includes one or more fluid slots to direct a shielding and/or cooling fluid toward the end of the tip and/or onto the workpiece. The insertion of one or more slots in the tip insert causing the shielding gas to pass closer to the electrode passing through the tip insert. The closer passing gas provides additional cooling to the tip insert especially at the end of the tip insert. The slot configuration in the tip insert can also be arranged so as to minimize turbulent flow of the one or more shielding gasses and/or reduce the amount of turbulence about the end of the tip insert. Turbulence of the one or more shielding can interfere with the proper shielding of the workpiece and can also interfere with the stratification of the gasses when two or more shielding gasses are used. In one embodiment, the tip section includes a tip insert that can be a standard insert or a custom wear resistant insert as discussed above. In another embodiment, the one or more slots are located along the outer surface of the tip insert. In one aspect of this embodiment, the tip insert includes at least two slots. In another aspect of this embodiment, the tip insert includes at least three slots. In yet another aspect of this embodiment, the tip insert includes at least four slots. In still another aspect of this embodiment, the slots are symmetrically positioned about the tip insert. In still yet another aspect of this embodiment, the slots are non-symmetrically positioned about the tip insert. In yet another embodiment, one or more slots are positioned partially or fully along the length of the tip section. In still another embodiment, one or more slots form a linear or non-linear path along the longitudinal length of the tip insert. In still yet another embodiment, one or more slots a have a uniform or non-uniform width and/or depth along the longitudinal length of the tip insert. In one aspect of this embodiment, the width of the slots is uniform along the length of the tip insert. In another aspect of this embodiment, the depth of the slots is uniform along the length of the tip insert. In yet another aspect of this embodiment, the depth of the slots is uniform along a portion of the length of the tip insert and the depth varies along a different portion of the tip insert. In still another aspect of this embodiment, the depth of the slots varies along length of the tip insert. In one arrangement of this aspect, the depth of the slots is greater at the end of the tip insert than at the beginning of the tip insert.

It is a principal object of the present invention to provide an improved torch head which can be used in a variety of welding applications.

It is another object of the present invention to provide a torch head having a smaller diameter than standard torch heads.

It is still another object of the present invention to provide a welding torch which includes a plurality of radial rods forming a inner chamber of the welding torch.

It is still yet another object of the present invention to provide a welding torch which includes one or more radial welding rods having passages for the conveyance of shielding gas and/or a cooling fluid there through.

It is a further object of the present invention to provide a welding torch which includes one or more structural radial rods to provide rigidity to the torch head.

It is another object of the present invention to provide a welding torch which includes a coupler to connect one or more radial rods together to rigidify and/or provide structural integrity to, the torch head.

It is still another object of the present invention to provide a welding torch that can provide stratified gas welding to the electrode and/or weld metal.

It is still yet another object of the present invention to provide a welding torch that can be used in MIG, MAG, plasma arc, STT, or TIG welding.

It is a further object of the present invention to provide a torch head which has a smaller diameter than standard welders and which incorporates a cooling fluid to cool a torch head during welding and which directs one or more shielding gases to the weld area to protect the electrode and/or weld metal during welding.

It is yet a further object of the present invention to provide a torch head which can be used with a consumable or non-consumable electrode.

It is still a further object of the present invention to provide a torch head which directs a shielding gas at a laminar flow about the electrode and/or weld area.

It is another object of the present invention to provide a welder which controls the amount and rate of shielding gas that is directed through the welding torch.

It is still another object of the present invention to provide a welding torch which controls the amount of cooling fluid which is directed through the welding torch.

It is still yet another object of the present invention to provide a welding torch which includes a welding tip that can be easily cleaned.

It is a further object of the present invention to provide a welding torch that has a welding tip that can be easily disconnected into a plurality of components to facilitate in easy and convenient cleaning and servicing.

It is yet a further object of the present invention to provide a welding torch that has a welding tip which includes a wear resistant electrical contact.

It is still a further object of the present invention to provide a welding torch which produces a weld bead and reduces the amount of spatter formed during the welding process.

I is another object of the present invention to provide a welding torch that includes a tip insert having one or more slots to direct a shielding and/or cooling fluid toward the end of the tip and/or onto the workpiece.

These and other objects of the present invention become apparent to one skilled in the art upon reading the description of the invention taken together with the accompanied drawings.

BRIEF DESCRIPTION OF THE DRAWINGS

Reference may now be made to the drawings, which illustrate various embodiments that the invention may take in physical form, and in certain parts and arrangements of parts wherein:

FIG. 10 is a cross-sectional view of another modified tip section of the torch head; and.

DETAILED DESCRIPTION OF THE PREFERRED EMBODIMENT

Figures 1, 2, 2A:
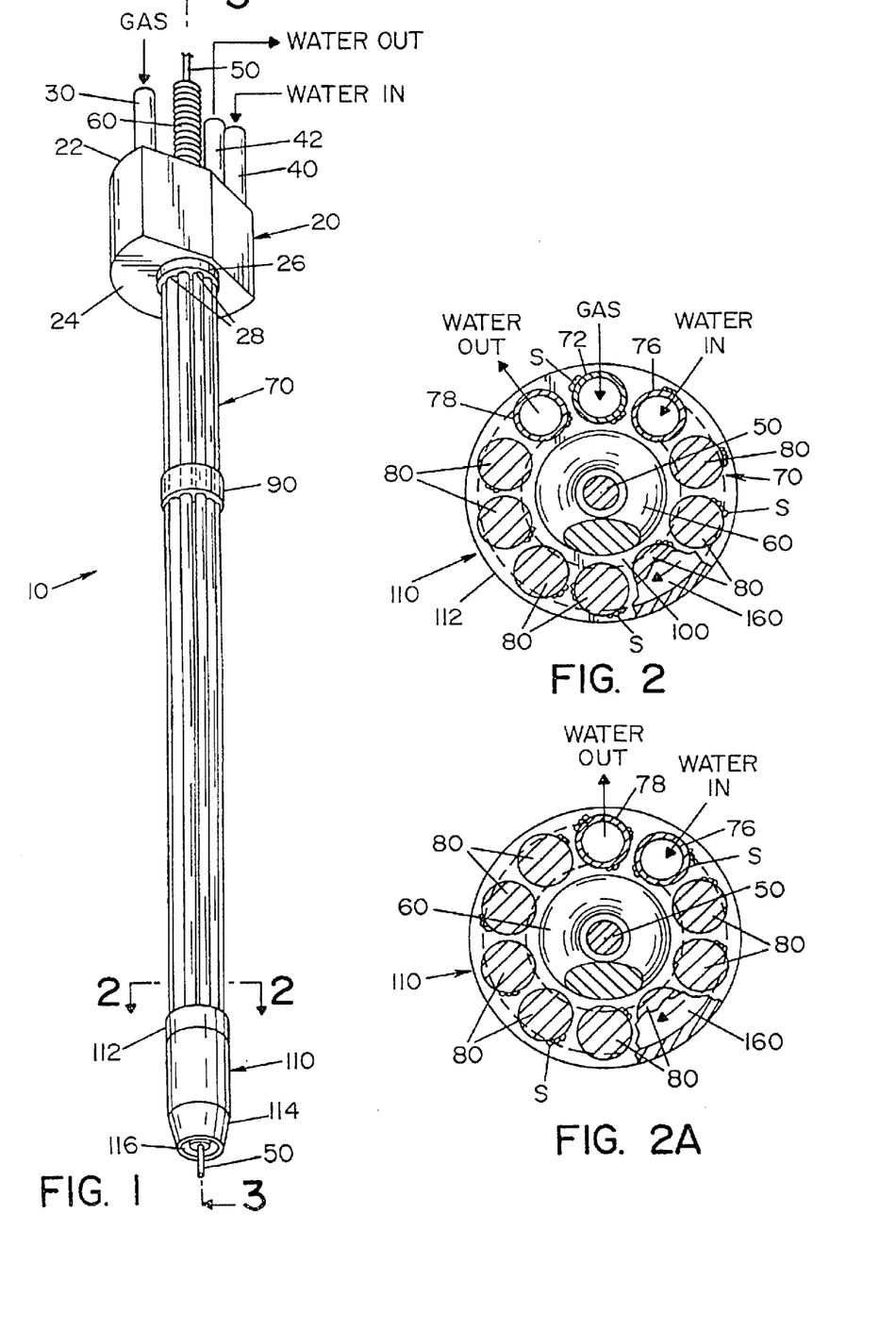
FIG. 1 is a perspective view of the torch head of the present invention.
FIG. 2 is an enlarged cross-sectional view taken along line 2—2 of FIG. 1.
FIG. 2A is a cross-sectional view similar to FIG. 2 showing an alternate embodiment of the invention.

Referring now to the drawings, wherein the showings are for the purposes of illustrating the preferred embodiment only and not for the purposes of limiting the same, FIG. 1 illustrates the improved torch head of the present invention. Torch head 10 includes a base section 20, a tip section 110 and a plurality of radial support rods 70 connected between the base section and tip section. Base section 20 is shown to include a top portion 22 having a gas inlet tube 30 and two cooling tubes 40, 42. Gas inlet tube 30 connects to a shielding gas source. The shielding gas can be any number of different shielding gases such as an inert gas, carbon dioxide or the like. Shielding gases that are commonly used in short circuit welding (MIG, MAG, STT) or TIG welding include argon, helium, and/or carbon dioxide. Although not shown, a gas regulator can be used to regulate the flow rate of shielding gas through inlet tube 30. Coolant tubes 40, 42 are designated as being connected to a water in source and a water out source. Although the coolant liquid is preferably water, a variety of other coolants can be used. As shown in FIG. 1, water coolant is directed into inlet tube 40 and is withdrawn from base section 20 from outlet tube 42. Although not shown, a coolant controller can be used to control the volume of coolant liquid which is directed into torch head 10.

Top portion 22 of base section 20 also includes an opening which receives a coil element 60. Coil element 60 provides a passageway to insert an electrode 50 there through. Electrode 50 is preferably a consumable electrode. The electrode may be a solid metal electrode, a metal electrode having a flux and/or alloyed coating, or a flux cored electrode which includes fluxing and/or alloying agents in the core. Although not shown, an electrode feeder can be used to control the speed at which the consumable electrode 50 is fed through coil element 60.

The bottom portion 24 of base section 20 is shown to include rod landing 26 which includes a plurality of landing openings 28. Inserted into each one of these landing openings is a radial support rods 70. As best illustrated in FIG. 2, ten radial support rods are secured to rod landing 26. Radial support rods 70 extend from base section 20 to the upper tip portion 112 of tip section 110. As shown in FIG. 1, a coupler 90 is connected to the radial support rods between base section 20 and tip section 110. Rod coupler 90 rigidly secures the radial support rods in place with respect to one another, thereby adding structural support to the radial support rods. Rod coupler 90 may be welded, glued, frictionally connected or the like to radial support means 70. Although not shown, one or more couplers 90 can be used to provide structural support and rigidity to torch head 10. As can be appreciated, radial support rods 70 may be welded or soldered together to rigidly connect one or more of the radial support rods together. Alternatively, an adhesive such as a high melting point epoxy or other type of bonding agent can be used to connect one or more radial support rods together to provide structural rigidity and/or to maintain the spacing of the radial support rods from one another.

Figure 3:
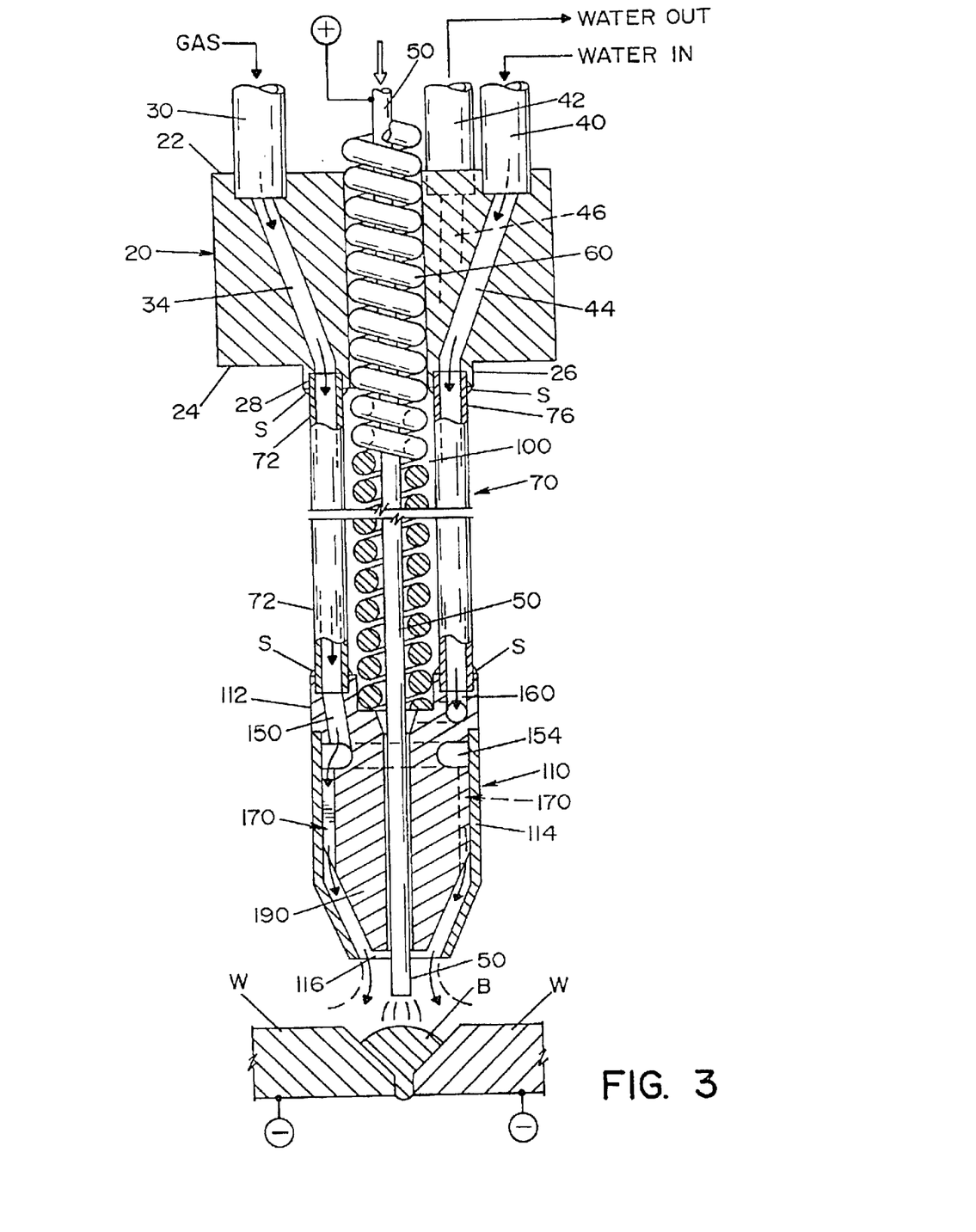
FIG. 3 is a cross-sectional view of the torch head taken along line 3—3 of FIG. 1.

Referring now to FIGS. 2 and 3, a plurality of radial support rods 70 include inner passageways. As shown in FIG. 2, three of the ten radial support rods include inner passageways. Cooling tubes 76 and 78 allow cooling fluid (i.e. water) to flow into and out of torch head 10. Gas tube 72 includes an inner passageway to allow a shielding gas to pass through torch head 10. As shown in FIG. 3, a shielding gas is directed into inlet tube 30 in base section 20 and through a gas passageway 34 in base section 20 which gas passageway is fluidly connected to one end of gas tube 72. FIG. 3 also illustrates that a cooling fluid is directed into coolant inlet tube 40 in base section 20 and through water passageway 44 which is fluidly connected to the top of cooling tube 76. Cooling fluid is returned through cooling tube 78 which is fluidly connected to water passageway 46 and is directed out of base section 20 through coolant outlet tube 42.

As shown in FIG. 2, several of the radial support rods 70 are solid rods without any internal passageways, thus forming support shaft 80. Support shaft 80 provides structural rigidity and strength to torch head 10. As can be appreciated, one or more support shaft 80 can include internal passageways without sacrificing the strength and rigidity of torch head 10.

As best shown in FIGS. 2 and 3, radial support rods 70 form an inner chamber 100 which encircles coil element 60 and electrode 50. The inner chamber 100 formed by radial support rods 70 provides protection to the internal components of torch head 10. The internal chamber is generally cylindrically shaped.

Referring again now to FIGS. 1–3, tip section 110 of torch head 10 includes an upper tip portion 112 which is connected to the bottom ends of radial support rods 70. As shown in FIGS. 2 and 3, radial support rods 70 are soldered to upper tip portion 112 by solder S. The upper ends of radial support rods 70 are also shown to be soldered to rod landing 26 of base section 20 by solder S. As shown in FIG. 3, upper tip portion 112 includes a coolant channel 160 which fluidly connects two or more cooling tubes together so that coolant can flow into and out of tip section 110. FIG. 3 also illustrates that upper tip portion 112 includes a gas channel 150 which is fluidly connected to the bottom end of gas tube 72 to enable shielding gas to flow into tip section 110. As shown in FIG. 3, gas channel 150 extends from upper tip portion 112 to lower tip portion 114 and intersects with gas ring channel 154. Gas ring channel 154 provides a passageway for shielding gas to inner gas cavity 170. Shielding gas flows through inner gas cavity 170 and out of base tip portion 116 of tip section 110. The arrows about the end of electrode 50 illustrates the flow of the shielding gas along the sides of electrode 50 and shielding the weld bead B in workpiece W as the weld metal from electrode 50 is transferred to the workpiece W. The flow of gas is preferably laminar. The shielding gas can be a single gas or mixture of gasses.

Lower tip portion 114 is illustrated as being removably secured to upper tip portion 112. Generally, lower tip portion 114 is threaded to or snapped onto upper tip portion 112. The removability of lower tip portion 114 facilitates in cleaning base tip portion 116 of tip section 110 to remove various types of debris, spattered weld metal and the like to ensure the proper operation of torch head 110.

Referring again to FIG. 3, the upper tip portion 112 includes an electrical contact 190. Electrical contact 190 forms an electrical connection with electrode 50 as the electrode passes through tip section 110. Electrical contact 190 is formed of a highly conductive material. One traditional highly conductive metal is copper. An improved electrical contact having greater wear resistivity can be used in upper tip portion 112. Traditional copper contacts are relatively soft metal. Electrodes typically are made of or include metals or materials that are harder than copper. As a result, the copper wears away over time as electrode 50 pass through upper tip portion 112. To reduce the wear problems that plague traditional electrical contacts, an improved electrical contact made of or includes a wear resistant material. Preferably, the wear resistant material is made of or includes tungsten, a copper-tungsten alloy and/or a copper-ceramic matrix. These wear resistant materials have been found to greatly extend the life of the electrical contact without sacrificing the quality of the electrical connection between electrical contact 190 and electrode 50.

Figure 9:
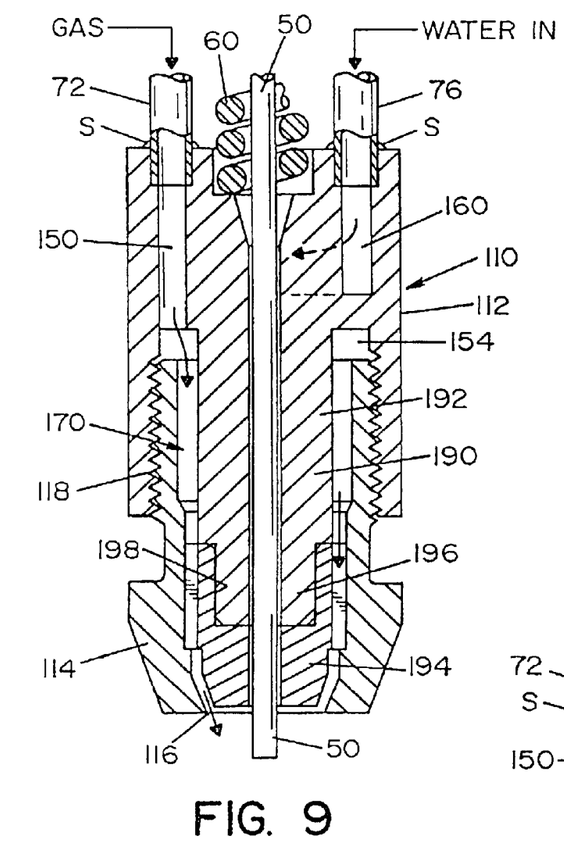
FIG. 9 is a cross-sectional view of a modified tip section of the torch head.
Figure 10:
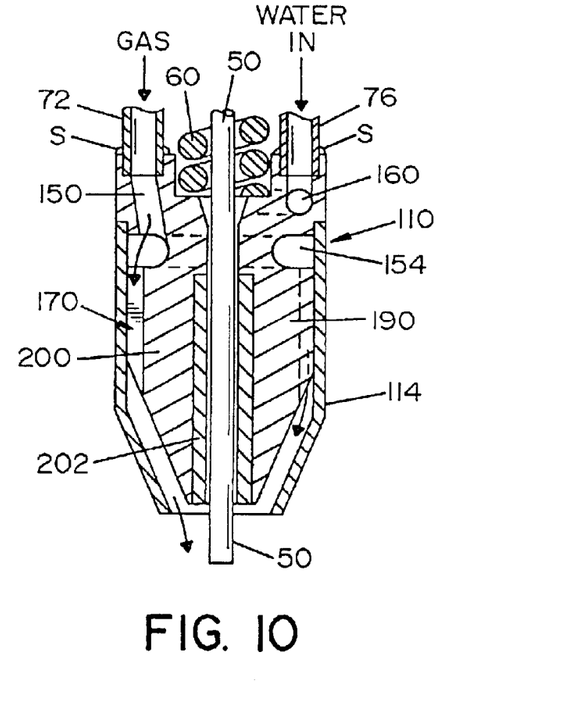

Referring now to FIGS. 9–10, two modified electrical contacts in the tip section are shown. Referring first to FIG. 9, tip section 110 has a lower tip portion 114 that is threaded by threads 118 to upper tip portion 112. Threads 118 allow lower tip portion 114 to be conveniently removed from the upper tip portion for purposes of servicing or replacing one or more components of tip section 110. Positioned in tip section 110 is a modified electrical contact 190. Electrical contract 190 is divided into two components, an upper section 192 and a lower section 194. Upper section 192 includes an end portion 196 which is received by cavity portion 198 in lower section 194. Upper section 192 and lower section 194 can be connected together in a variety of manners such as, but not limited to, threads, tongue and grooves, pressure contact, adhesive, soldering, welding or the like. The upper and lowers sections of electrical contact 190 have different material compositions. The upper section 192 is made of a material having a high thermal conductivity to increase the heat transfer from upper section 192 to lower section 194. The composition of upper section 192 include metals such as copper, copper alloys, aluminum and/or aluminum alloys. Preferably, upper section 192 is primarily made of copper. Lower section 194 includes a material that is electrically conductive and has excellent wear resistant characteristics. The highly wear resistant lower section 194 resists being wore down as the electrode passes by and contacts the electrical contact. As a result, the life of the electrical contact is greatly extended. The composition of lower section 194 includes a metal such as tungsten, a copper-tungsten alloy and/or a copper-ceramic matrix materials. Preferably, lower section 194 is primarily made of tungsten.

Referring now to FIG. 10, another modified version of electrical contact 190 is shown. Electrical contact 190 is made of two components, namely an outer sleeve 200 and an inner sleeve 202. Outer sleeve 200 is made of a material having a high thermal conductivity to increase the heat transfer from outer sleeve 200 to interior sleeve 202. The composition of outer sleeve 200 includes metals such as copper, copper alloys, aluminum and/or aluminum alloys. Preferably the outer sleeve is primarily made of copper. Inner sleeve 202 includes a material that is electrically conductive and has excellent wear resistant characteristics. The highly wear resistant inner sleeve resists being wore down as the electrode passes by and contacts the electrical contact. As a result, the life of the electrical contact is greatly extended. The composition of inner sleeve 202 includes metal such as tungsten, a copper-tungsten alloy and/or a copper-ceramic matrix materials. Preferably the inner sleeve is primarily made of tungsten. As can be appreciated, the inner sleeve and the outer sleeve of electrical contact 190 can be connected or formed together so that the two sleeves cannot be disconnected from one another. It can also be appreciated that the inner and outer sleeves can be connected together so that the inner sleeve can be removed from the outer sleeve so that the inner sleeve can be serviced or replaced without having to remove and/or replace the outer sleeve.

Referring now to FIG. 2A, an alternative embodiment of torch head 10 is illustrated. In this embodiment, two of radial support rods 70 include inner passageways. Cooling tubes 76 and 78 allow cooling fluid to flow into and out of torch head 10. The remaining radial support rods 70 are solid rods without any internal passageways, thus forming support shafts 80. As can be appreciated, support shafts need not be solid rods. The radial support rods are merely defined as radial rods that do not internally transport a fluid from base section 20 to tip section 110. In several welding operations, a shielding gas is not required. One such welding operation occurs when a self shielding electrode is used. The embodiment illustrated in FIG. 2A can be modified for use with a shielding gas. If a shielding gas is used, the shielding gas is directed through coil element 60. Coil element 60 generally has a greater inner diameter than the diameter of electrode 50. As a result, a shielding gas can be directed into coil element 60 as the electrode 50 is also feed through coil element 60. When a single shielding gas is used, the shielding gas can include an inert gas, carbon dioxide or the like.

Figures 4, 5, 8:
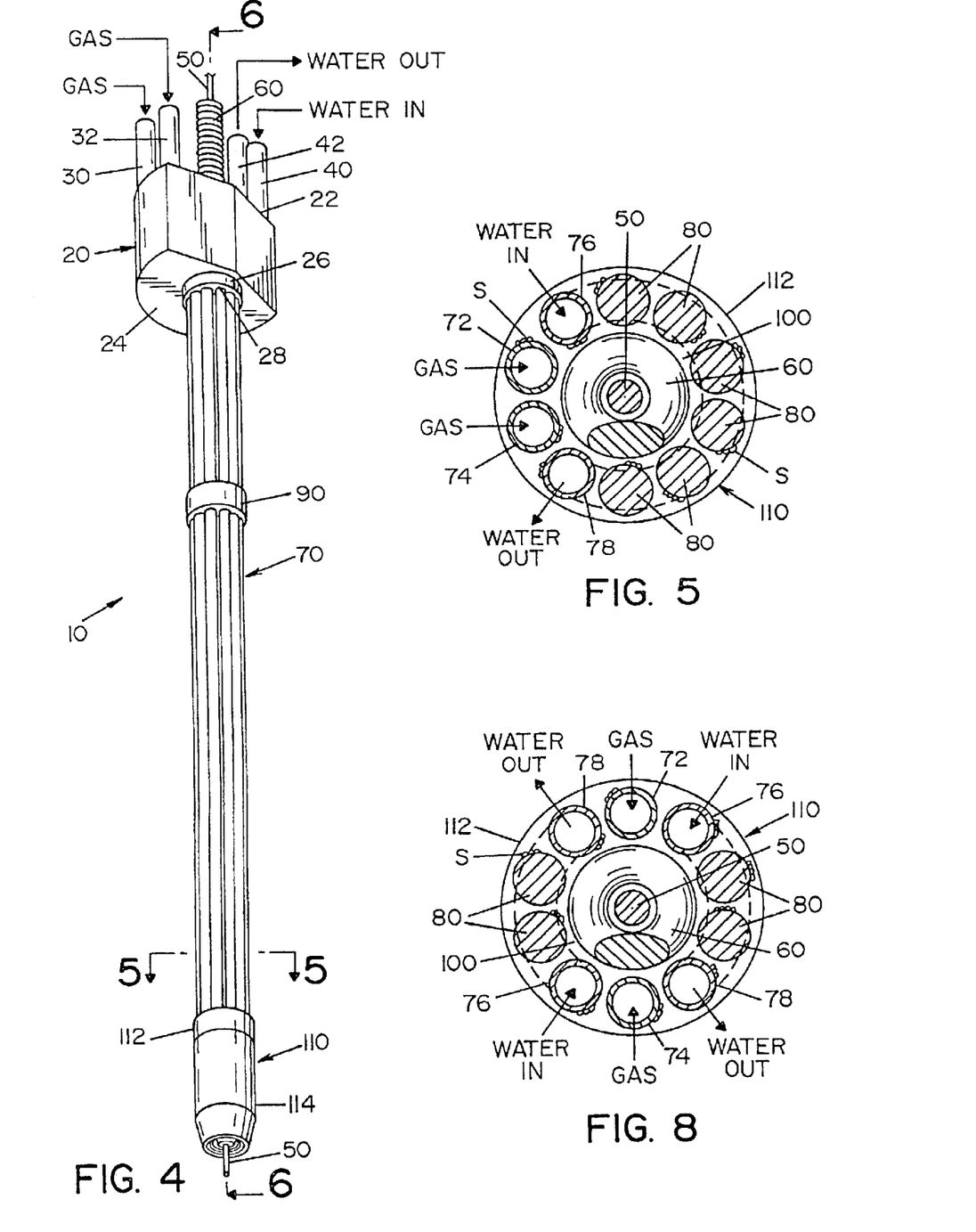
FIG. 4 is a perspective view of an alternative embodiment of the torch head of the present invention.
FIG. 5 is a cross-sectional view of the torch head taken along line 5—5 of FIG. 4.
FIG. 8 is a cross-sectional view similar to FIG. 5 illustrating an alternative embodiment of the invention.
Figure 4A:
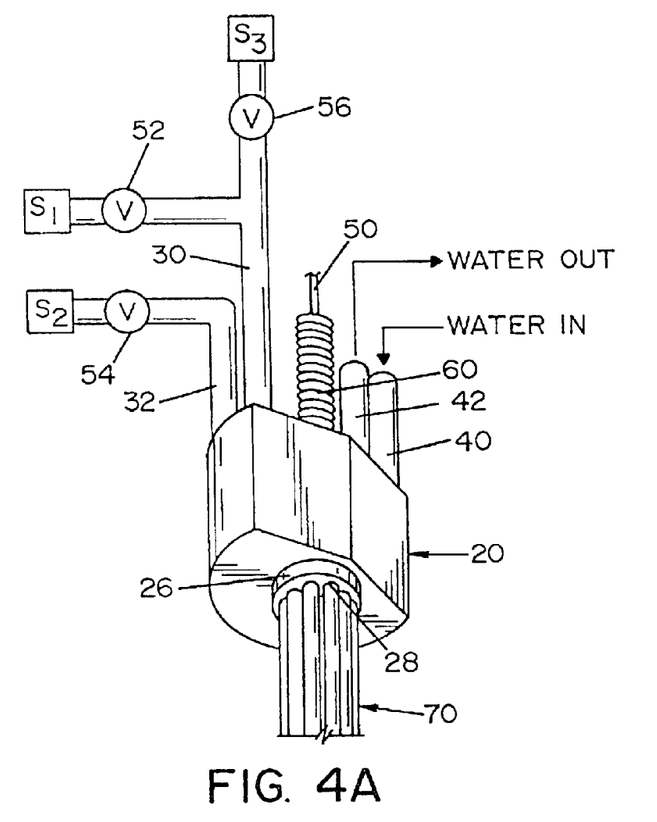
FIG. 4A is a partial perspective view of another alternative embodiment of the torch head of the present invention.
Figures 6, 7:
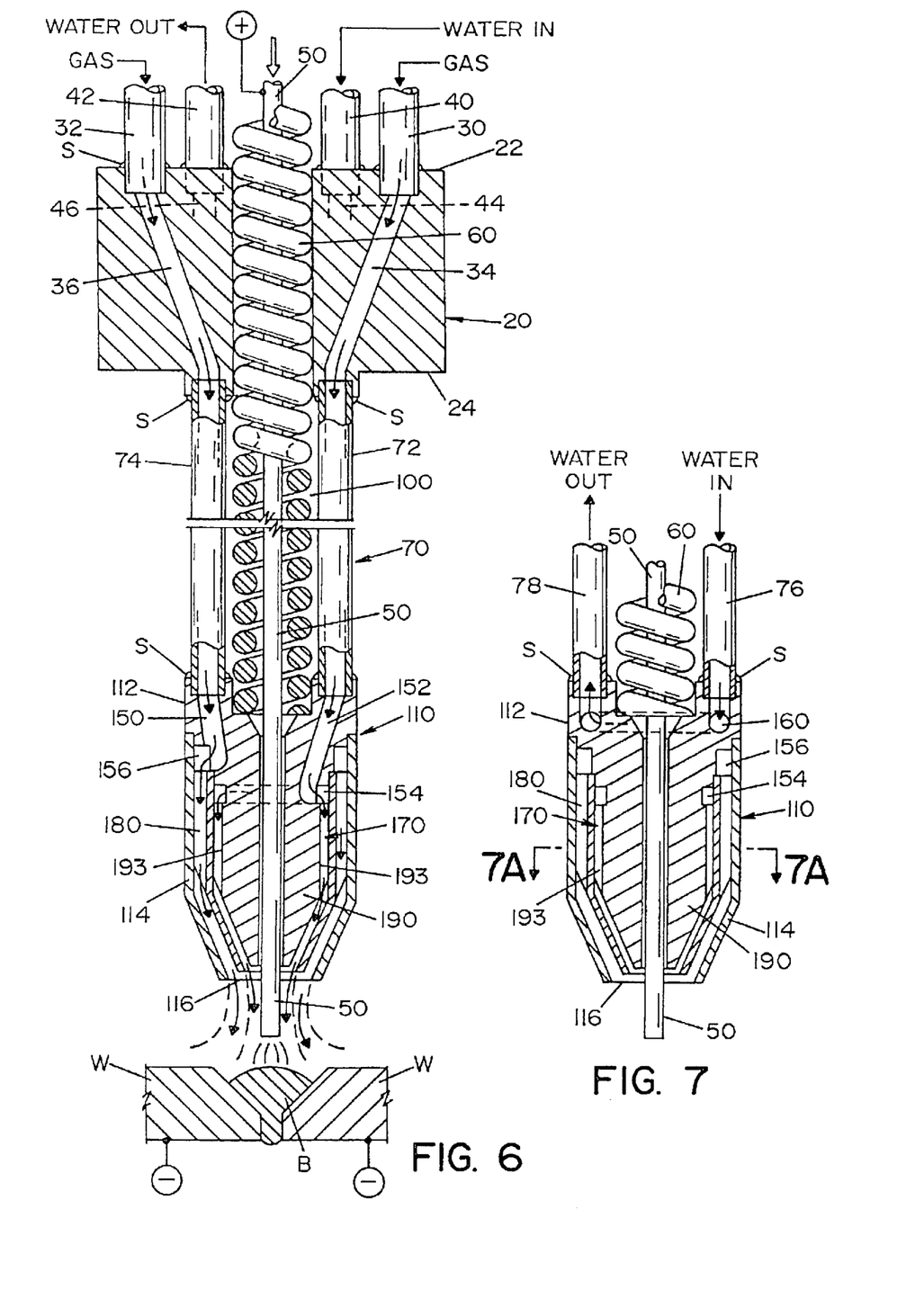
FIG. 6 is a cross-sectional view of the torch head taken along line 6—6 of FIG. 4.
FIG. 7 is another cross-sectional view of the torch head of FIG. 4 illustrating the tip section of the torch head and the cooling passageway for the torch head.
Figure 7A:
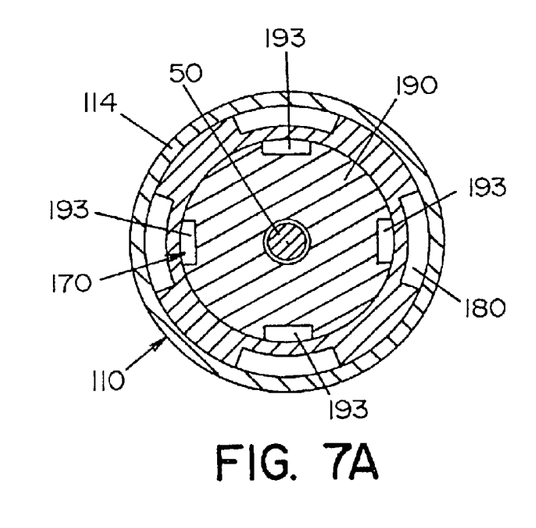
FIG. 7A is a cross-sectional view of the torch head taken along line 7A—7A of FIG. 7.

Referring now to FIGS. 4–7, an alternative embodiment of torch head 10 is illustrated. In this alternative embodiment, two shielding gases are directed into base section 20 via gas inlet tubes 30, 32. As shown in FIGS. 5 and 6, two of the radial support rods 70 are gas tubes 72, 74 which direct the two shielding gases from base section 20 to tip section 110. The base section 20 includes gas passageway 34, 36 to direct each shielding gas from inlet tubes 30, 32 through the base section and into gas tubes 72, 74 respectively. Tip section 110 is modified to accommodate the two shield gases. Tip section 110 includes two gas channels 150, 152 for each shielding gas. Two gas channels 154, 156 are designed to direct the shielding gases to the respective inner and outer gas cavities 170, 180. As shown in FIGS. 6–7A, inner gas cavity 170 directs shielding gas about electrode 50 and onto weld bead B. FIG. 7A illustrates that the inner gas cavities 170 are formed by four slots 193 in the outer surface of electrical contract 190. As can be appreciated, more or less slots can be formed in the outer surface of electrical contract 190. Outer gas cavity 180 directs shielding gas about the inner shielding gas thereby creating a stratified shielding gas profile. The flow of the two shielding gasses through tip section 110 is shown to be laminar flow. As can be appreciated, non-laminar flows can also be used. Referring now to FIG. 4A, the amount of shielding gas $S_1$ directed into gas inlet tube 30 is controlled by valve 52. The amount of shielding gas $S_2$ directed into gas inlet tube 32 is controlled by valve 54. Valves 52 and 54 can be manually and/or automatically controlled to maintain the desired gas flow rates through the gas inlet tubes 30, 32 and/or to maintain the desired gas ratio of shielding gases $S_1$, $S_2$ to the workpiece W. The shielding gas directed through inlet tube 30 is an inert gas such as argon and/or helium. The shielding gas directed through inlet tube 32 is carbon dioxide. The volume ratio of inert gas to carbon dioxide through tip section 110 is about 1:1 to 1:10. Preferably, the volume of carbon dioxide is over twice the volume of inert gas being flowed through tip section 110.

FIG. 4A illustrates another embodiment wherein a third shielding gas $S_3$ is connected to gas inlet tube 30. Shielding gas $S_3$ is preferably an inert gas. Control valve 56 controls the amount of shielding gas $S_3$ that is directed into gas inlet tube 32. Valve 56 can be manually and/or automatically controlled to maintain the desired gas flow rate of shielding gas $S_3$ through the gas inlet tube 30 and/or to maintain the desired gas ratio of shielding gases $S_1$, $S_3$ to the workpiece W. When shielding gas $S_3$ is used, shielding gas $S_3$ is preferably helium and shielding gas $S_1$ is preferably argon. The addition of helium in the shielding gas mixture has been found to improve weld bead penetration. Preferably the ratio of argon to helium is about 1:1 to 50:1.

FIG. 7 illustrates the coolant channel 160 used in the modified tip section 110 to direct coolant into and out of tip section when used in combination with a dual shielding gas welding torch. The flow of coolant through torch head 10 shown in FIGS. 6 and 7 is similar to the flow of coolant shown in FIG. 3. As shown in FIGS. 4, 6 and 7, the assembly, operation and structure of torch head 10 is similar to the torch head illustrated in FIGS. 1 and 3, thus will not be repeated.

FIG. 8 illustrates another modification of the torch head wherein two shielding gases are directed into the torch head and more than two of the radial support rods 70 are designed to be cooling tubes. Specifically, FIG. 8 illustrates that two of the radial support rods 70 are gas tubes and four of the radial support rods 70 are cooling tubes. The additional cooling tubes provide additional cooling to the torch head. The additional cooling is preferable in welding electrodes used in conjunction with moderate to high currents directed through electrode 50.

Referring again to FIGS. 1–3, torch head 10 can be modified for use with two or more shielding gasses. As previously described, torch head 10 includes a base section that has one gas inlet 30. When another shielding gas is to be used, the second shielding gas can be directed into coil element 60 as previously described with reference to FIG. 2A. Using this modification, a stratified shielding gas about the electrode and weld bead can be obtained. When a stratified shielding gas arrangement is desired, an inert gas, such as argon and/or helium is preferably directed into coil element 60 so that the inert gas is positioned closest to the electrode as the electrode exits tip section 110. Carbon dioxide is preferably directed into gas inlet tube 30 so that the carbon dioxide forms a gas protective layer about the inert gas as the electrode exits tip section 110.

Figure 11:
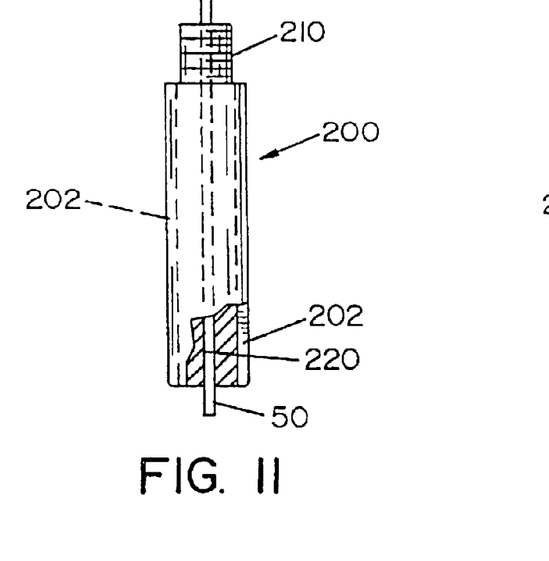
FIGS. 11–13 are side views of alternative embodiments of three tip inserts having different slot configurations along the length of the tip inserts.
Figure 12:
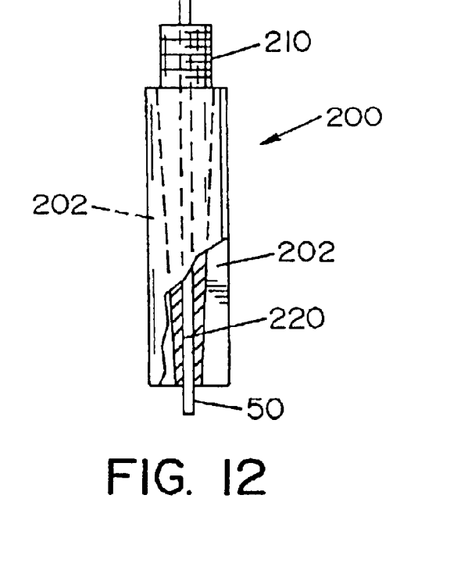
Figure 13:
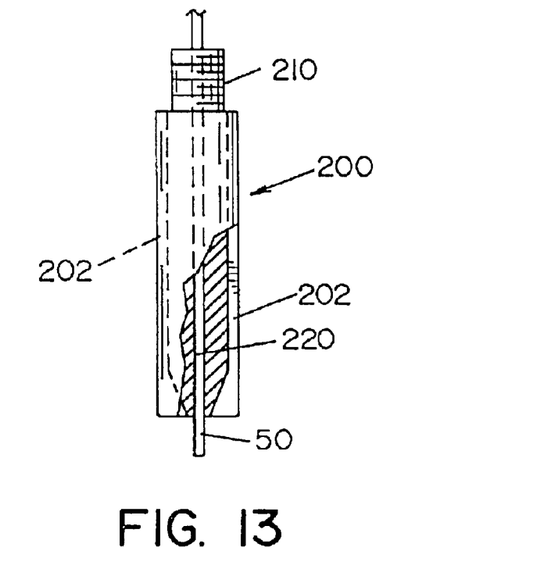

Referring now to FIGS. 11–13, torch head 10 can include a tip section having modified tip portion 200. Tip portion 200 is a standard tip design that is modified to includes one or more slots 202 to allow one or more shielding gasses to be directed to workpiece W. As can be appreciated, tip portion can also be designed as the tip portion illustrated in FIGS. 3, 5, 6, 7, 7A, 9 or 10. Tip portion 200, includes a standard threaded end 210 for easy connection and disconnection to the torch head. Tip portion 200 also includes a central opening 220 to allow electrode 50 to pass there through. FIGS. 11–13 illustrate three different slot configurations in tip portion 200. Referring to FIG. 11, slots 202 have a constant width and depth along the longitudinal length of the tip portion. FIG. 12 illustrates the slots having a constant width and an increasing depth along the longitudinal length of the tip portion. FIG. 13 illustrates the slots having a constant width along the longitudinal length of the tip portion and a constant depth along the upper tip portion and an increasing depth along the lower tip portion. As can be appreciated from the slot design of FIGS. 12 and 13, the shielding gas is directed toward the central axis of the tip portion which causes the shielding gasses flow closer to electrode 50 thereby providing additional cooling at the end of the tip portion. The slot configurations shown in FIGS. 11–13 result in improved cooling at the end of the tip portion, and reduced gas turbulence at the end of the tip portion thereby facilitating in the laminar flow of the gasses from the tip portion to the workpiece.

Referring again to FIGS. 4–13, torch head 10 can be modified for use with three or more shielding gasses. When a third shielding gas is to be used, the third shielding gas can be directed into coil element 60 as previously described with reference to FIG. 2A.

Although not specifically shown, torch head 10 can be used without tip section 110. In such an design, a coupler 90 is preferably positioned near and/or at the end of the radial support rods 70 to provide structural rigidity to such a design.

The invention has been described with reference to a preferred embodiment and alternates thereof. It is believed that many modifications, alterations to the embodiments disclosed will readily suggest themselves to those skilled in the art upon reading and understanding the detailed description of the invention. It is intended to include all such modifications and alterations insofar as they come within the scope of the present invention.

I claim:

1. A torch head for use in forming a weld bead on a workpiece comprising a base section, a tip section spaced from the base section, at least three rods connected to the base section and the tip section, and an electrode sleeve positioned in said inner chamber, said rods positioned together to form an inner chamber for an electrode, said tip section having an electrode opening designed to allow the electrode to pass therethrough and at least one gas slot, at least one of said rods being a shielding gas rod having an inner passageway to at least partially direct a first shielding gas from said base section to said tip section and into said gas slot, said electrode sleeve having an inner passageway to accommodate a consumable electrode.

2. The torch head as defined in claim 1, including another shielding gas rod that includes an inner passageway to direct a second shielding gas from said base section to said tip section.

3. The torch head as defined in claim 1, wherein at least one of said rods other than said at least one shielding gas rod being a structural rod, said structural rod not transporting fluid between said base section and said tip section.

4. The torch head as defined in claim 1, wherein at least two of said rods other than said at least one shielding gas rod being cooling rods having an inner passageway to allow a cooling fluid to flow therethrough and cool at least a portion of said tip section.

5. The torch head as defined in claim 1, wherein said at least three rods are connected by a coupling band positioned between said base section and said tip section.

6. The torch head as defined in claim 1, wherein said inner chamber formed by said at least three rods has a substantially uniform circular cross-sectional shape.

7. A torch head for use in forming a weld bead on a workpiece comprising a base section, a tip section spaced from the base section, at least three rods connected to the base section and the tip section, and an electrode sleeve positioned in said inner chamber, said rods positioned together to form an inner chamber, said tip section having an electrode opening, at least two of said rods being cooling rods having an inner passageway to allow a cooling fluid to flow therethrough and cool at least a portion of said tip section, said electrode sleeve having an inner passageway to accommodate a consumable electrode.

8. The torch head as defined in claim 7, wherein said at least two rods having passageways for a cooling liquid are fluidly connected in said tip section.

9. The torch head as defined in claim 7, wherein said tip section including a cooling passageway which fluidly connects said at least two rods having passageways for a cooling liquid.

10. The torch head as defined in claim 7, wherein at least one of said rods other than said at least two cooling rods being a structural rod, said structural rod not transporting fluid between said base section and said tip section.

11. The torch head as defined in claim 7, wherein at least one of said rods other than said at least two cooling rods being a shielding gas rod having an inner passageway to direct a first shielding gas from said base section to said tip section.

12. The torch head as defined in claim 7, wherein said at least three rods are connected by a coupling band positioned between said base section and said tip section.

13. The torch head as defined in claim 7, wherein said inner chamber formed by said at least three rods has a substantially uniform circular cross-sectional shape.

14. A torch head for use in forming a weld bead on a workpiece comprising a base section, a tip section spaced from the base section, and at least three rods connected to the base section and the tip section, said rods positioned together to form an inner chamber, said tip section having an electrode opening, at least two of said rods being structural rods, said structural rods not transporting fluid between said base section and said tip section.

15. The torch head as defined in claim 14, including an electrode sleeve positioned in said inner chamber, said electrode sleeve having an inner passageway to accommodate a consumable electrode.

16. The torch head as defined in claim 14, wherein at least one of said rods other than said at least two structural rods being a shielding gas rod having an inner passageway to direct a first shielding gas from said base section to said tip section.

17. The torch head as defined in claim 14, wherein at least two of said rods other than said at least two structural rods being cooling rods having an inner passageway to allow a cooling fluid to flow therethrough and cool at least a portion of said tip section.

18. The torch head as defined in claim 14, wherein said at least three rods are connected by a coupling band positioned between said base section and said tip section.

19. The torch head as defined in claim 14, wherein said inner chamber formed by said at least three rods has a substantially uniform circular cross-sectional shape.

20. A torch head for use in forming a weld bead on a workpiece comprising a removable tip section, said removable tip section having an electrode opening designed to enable a consumable electrode to pass through the electrode opening, said removable tip section having an electrical contact to form an electrical connection with said consumable electrode, said electrical contact including a wear resistant material that resists wear from said consumable electrode contacting and moving by said electrical contact, said electrical contact including an inner sleeve and an outer sleeve, said inner sleeve at least partially including said wear resistant material, said inner sleeve including a material that is different from a material in said outer sleeve, said outer sleeve at least partially forming at least one gas slot spaced from said electrode opening.

21. The torch head as defined in claim 20, wherein said outer sleeve including a plurality of gas slots spaced from said electrode opening.

22. The torch head as defined in claim 20, wherein said at least one gas slot having a variable cross-sectional area along at least a portion of said electrical contact.

23. The torch head as defined in claim 20, wherein said inner sleeve is releasably connected to said outer sleeve.

24. The torch head as defined in claim 20, wherein said inner sleeve is spaced upwardly from a bottom end of said torch head.

25. A torch head for use in forming a weld bead on a workpiece comprising a base section, a tip section spaced from the base section, and at least three rods connected to the base section and the tip section, said rods positioned together to form an inner chamber for an electrode, said tip section having an electrode opening designed to allow the electrode to pass therethrough and at least one gas slot, at least one of said rods being a shielding gas rod having an inner passageway to at least partially direct a first shielding gas from said base section to said tip section and into said gas slot, wherein at least one of said rods other than said at least one shielding gas rod being a structural rod, said structural rod not transporting fluid between said base section and said tip section.

26. The torch head as defined in claim 25, including another shielding gas rod that includes an inner passageway to direct a second shielding gas from said base section to said tip section.

27. The torch head as defined in claim 25, including an electrode sleeve positioned in said inner chamber, said electrode sleeve having an inner passageway to accommodate a consumable electrode.

28. The torch head as defined in claim 25, therein at least two of said rods other than said at least one shielding gas rod being cooling rods having an inner passageway to allow a cooling fluid to flow therethrough and cool at least a portion of said tip section.

29. The torch head as defined in claim 25, wherein said at least three rods are connected by a coupling band positioned between said base section and said tip section.

30. The torch head as defined in claim 25, wherein said inner chamber formed by said at least three rods has a substantially uniform circular cross-sectional shape.

31. A torch head for use in forming a weld bead on a workpiece comprising a base section, a tip section spaced from the base section, and at least three rods connected to the base section and the tip section, said rods positioned together to form an inner chamber, said tip section having an electrode opening, at least two of said rods being cooling rods having an inner passageway to allow a cooling fluid to flow therethrough and cool at least a portion of said tip section, at least one of said rods other than said at least two cooling rods being a structural rod, said structural rod not transporting fluid between said base section and said tip section.

32. The torch head as defined in claim 31, wherein said at least two rods having passageways for a cooling liquid are fluidly connected in said tip section.

33. The torch head as defined in claim 31, wherein said tip section including a cooling passageway which fluidly connects said at least two rods having passageways for a cooling liquid.

34. The torch head as defined in claim 31, including an electrode sleeve positioned in said inner chamber, said electrode sleeve having an inner passageway to accommodate a consumable electrode.

35. The torch head as defined in claim 31, wherein at least one of said rods other than said at least two cooling rods being a shielding gas rod having an inner passageway to direct a first shielding gas from said base section to said tip section.

36. The torch head as defined in claim 31, wherein said at least three rods are connected by a coupling band positioned between said base section and said tip section.

37. The torch head as defined in claim 31, wherein said inner chamber formed by said at least three rods has a substantially uniform circular cross-sectional shape.

38. A torch head for use in forming a weld bead on a workpiece comprising a base section, a tip section spaced from the base section, and at least three rods connected to the base section and the tip section, said rods positioned together to form an inner chamber for an electrode, at least three of said rods positioned substantially symmetrically about said inner chamber, said tip section having an electrode opening adapted to allow the electrode to pass therethrough and at least one gas slot, at least one of said rods being a shielding gas rod having an inner passageway to at least partially direct a first shielding gas from said base section to said tip section and into said gas slot.

39. The torch head as defined in claim 38, including another shielding gas rod that includes an inner passageway to direct a second shielding gas from said base section to said tip section.

40. The torch head as defined in claim 38, including an electrode sleeve positioned in said inner chamber, said electrode sleeve having an inner passageway to accommodate a consumable electrode.

41. The torch head as defined in claim 38, wherein at least one of said rods other than said at least one shielding gas rod being a structural rod, said structural rod not transporting fluid between said base section and said tip section.

42. The torch head as defined in claim 38, wherein at least two of said rods other than said at least one shielding gas rod being cooling rods having an inner passageway to allow a cooling fluid to flow therethrough and cool at least a portion of said tip section.

43. The torch head as defined in claim 38, wherein said at least three rods are connected by a coupling band positioned between said base section and said tip section.

44. The torch head as defined in claim 38, wherein said inner chamber formed by said at least three rods has a substantially uniform circular cross-sectional shape.

45. A torch head for use in forming a weld bead on a workpiece comprising a base section, a tip section spaced from the base section, and at least three rods connected to the base section and the tip section, said rods positioned together to form an inner chamber, at least three of said rods positioned substantially symmetrically about said inner chamber, said tip section having an electrode opening, at least two of said rods being cooling rods having an inner passageway to allow a cooling fluid to flow therethrough and cool at least a portion of said tip section.

46. The torch head as defined in claim 45, wherein said at least two rods having passageways for a cooling liquid are fluidly connected in said tip section.

47. The torch head as defined in claim 45, wherein said tip section including a cooling passageway which fluidly connects said at least two rods having passageways for a cooling liquid.

48. The torch head as defined in claim 45, including an electrode sleeve positioned in said inner chamber, said electrode sleeve having an inner passageway to accommodate a consumable electrode.

49. The torch head as defined in claim 45, wherein at least one of said rods other than said at least two cooling rods being a structural rod, said structural rod not transporting fluid between said base section and said tip section.

50. The torch head as defined in claim 45, wherein at least one of said rods other than said at least two cooling rods being a shielding gas rod having an inner passageway to direct a first shielding gas from said base section to said tip section.

51. The torch head as defined in claim 45, wherein said at least three rods are connected by a coupling band positioned between said base section and said tip section.

52. The torch head as defined in claim 45, wherein said inner chamber formed by said at least three rods has a substantially uniform circular cross-sectional shape.

\* \* \* \* \*